Patented Jan. 31, 1939

2,145,344

UNITED STATES PATENT OFFICE 2,145,344

STABLE PHOSPHORUS-CONTAINING OIL EMULSIONS

Fritz Draisbach, Ludwigshafen-on-the-Rhine, Germany, assignor to Hall Laboratories, Inc., Pittsburgh, Pa., a corporation of Pennsylvania No Drawing. Application July 11, 1936, Serial No. 90,256. In Germany July 20, 1935

4 Claims. (Cl. 167—66)

This invention relates to stable phosphorus-containing oil emulsions and to a process of preparing the same. It is described more particularly herein as applied to the preparation of aqueous cod liver oil emulsions.

The use of aqueous cod liver oil emulsions, especially as fodder, has been proved to be more advantageous than the use of cod liver oil alone. It has already been shown that emulsions are more easily and completely absorbed by animal organisms and therefore are utilized more efficiently. The use of certain emulsifying agents, such as methyl cellulose, gum tragacanth and other colloids, has been found to be necessary in the preparation of such emulsions. In order to increase the nutritive value of such cod liver oil emulsions, inorganic phosphorus-containing compounds, for example hypophosphites, have also been added, but since they have no emulsifying action, the use of emulsifying agents is still indispensable.

I have found that with the aid of small amounts of alkali metaphosphate, say ⅛% to 10% of the amount of water present, either alone or combined with alkali pyrophosphate, a stable aqueous cod liver oil emulsion can be produced, the emulsion containing a phosphorus salt which has very valuable properties when the emulsion is supplied to an animal organism. If necessary, beside the alkali metaphosphate, other known emulsifying agents could be used, by means of which especially stable emulsions can be obtained.

Two very important advantages are therefore secured by my invention, namely, stabilization of the emulsion and an increase in its nutritive value.

The alkali metaphosphate which I prefer to use is the soluble sodium metaphosphate sometimes called "Graham's salt", (Textbook of Inorganic Chemistry, edited by J. Newton Friend, vol. 6, part 2, page 177, by J. B. R. Prideaux, Philadelphia, 1934; Gmelin, Handbuch der Anorganischen Chemie, vol 21, page 922, 8th Edition, Berlin, 1928); or "Graham's metaphosphate" (a Dictionary of Chemistry by Henry Watts, vol. 4, page 578, New York, 1873; A Treatise on Chemistry, by Roscoe & Schorlemmer, vol. 2, part 1, page 283, New York, 1923), and which may have mixed with it a small amount of sodium pyrophosphate to counteract the slight acidity of the sodium metaphosphate. Graham's metaphosphate or salt is believed to consist principally of sodium hexametaphosphate. The sodium hexametaphosphate is assumed to be a complex of the general formula $Na_2(Na_4P_6O_{18})$, although some authorities believe that salts of the formula $Na_5(NaP_6O_{18})$ and $Na_4(Na_2P_6O_{18})$ may also be present.

The invention has been described by way of example only in connection with the preparation of aqueous cod liver oil emulsions. It is useful, however, in preparing aqueous emulsions of halibut oil or other animal, vegetable or mineral oil. The invention is not limited to the specific embodiment disclosed, but may be, otherwise embodied or practiced within the scope of the following claims.

I claim:

1. A stable aqueous non-acid vitamin-containing oil emulsion adapted for use as a food for animal organisms and containing an alkali metaphosphate as an emulsifying agent.

2. A stable aqueous non-acid vitamin-containing oil emulsion adapted for use as a food for animal organisms and containing Graham's salt as an emulsifying agent.

3. A stable aqueous alkaline vitamin-containing oil emulsion adapted for use as a food for animal organisms and containing an alkali metaphosphate as an emulsifying agent.

4. A stable aqueous non-acid cod liver oil emulsion containing an alkali metaphosphate as an emulsifying agent.

FRITZ DRAISBACH.